United States Patent [19]

Nomura et al.

[11] 4,273,987
[45] Jun. 16, 1981

[54] METHOD OF CONTROLLING SYNCHRONIZED MOVEMENT OF BACKING SHOE IN AUTOMATIC ONE-SIDE WELDING

[75] Inventors: Hirokazu Nomura; Yukihiko Sato, both of Tsu; Yoshikazu Sato, Mie, all of Japan

[73] Assignee: Nippon Kokan Kabushiki Kaisha, Tokyo, Japan

[21] Appl. No.: 75,204

[22] Filed: Sep. 12, 1979

[30] Foreign Application Priority Data

Sep. 19, 1978 [JP] Japan ................................ 53-114070

[51] Int. Cl.³ ................................................ B23K 9/12
[52] U.S. Cl. .......................... 219/124.34; 219/137 R; 228/9
[58] Field of Search .......... 219/137 R, 124.34, 124.22; 318/577; 228/8, 9

[56] References Cited

U.S. PATENT DOCUMENTS 3,575,574  4/1971  Almquist .......................... 219/137 R
3,819,902  6/1974  Sidbeck et al. .................. 219/124.34

FOREIGN PATENT DOCUMENTS 2608720  9/1977  Fed. Rep. of Germany ...... 219/124.34
52-43612  11/1977  Japan .
52-45297  11/1977  Japan .

901203  7/1962  United Kingdom ................ 219/124.34

Primary Examiner—G. C. Shaw
Attorney, Agent, or Firm—Fleit & Jacobson

[57] ABSTRACT

A method of controlling the synchronized movement of a backing shoe in an automatic one-side welding of the type in which a light-transmittable backing material is placed in close contact with the back surface of the welding joint and a backing shoe adapted to be moved along with the movement of a welding apparatus is pressed through the backing material against the back surface of the welding joint just below a welding electrode whereby effecting the welding. The method employs photoelectric detectors which are embedded in the surface of the backing shoe contacting the backing material at four positions, i.e., right-front, right-back, left-front and left-back positions just below the electrode with respect to the direction of welding and the detectors are arranged at predetermined distances from each other, whereby the light emitted from the back surface of the welding joint and transmitted through the backing material is received by the detectors each of which generates an electric signal corresponding to the received light magnitude and the speed of travel as well as the lateral position of the backing shoe are controlled in such a manner that the below-electrode-point is maintained at a predetermined position among the light receiving positions on the backing shoe.

1 Claim, 4 Drawing Figures

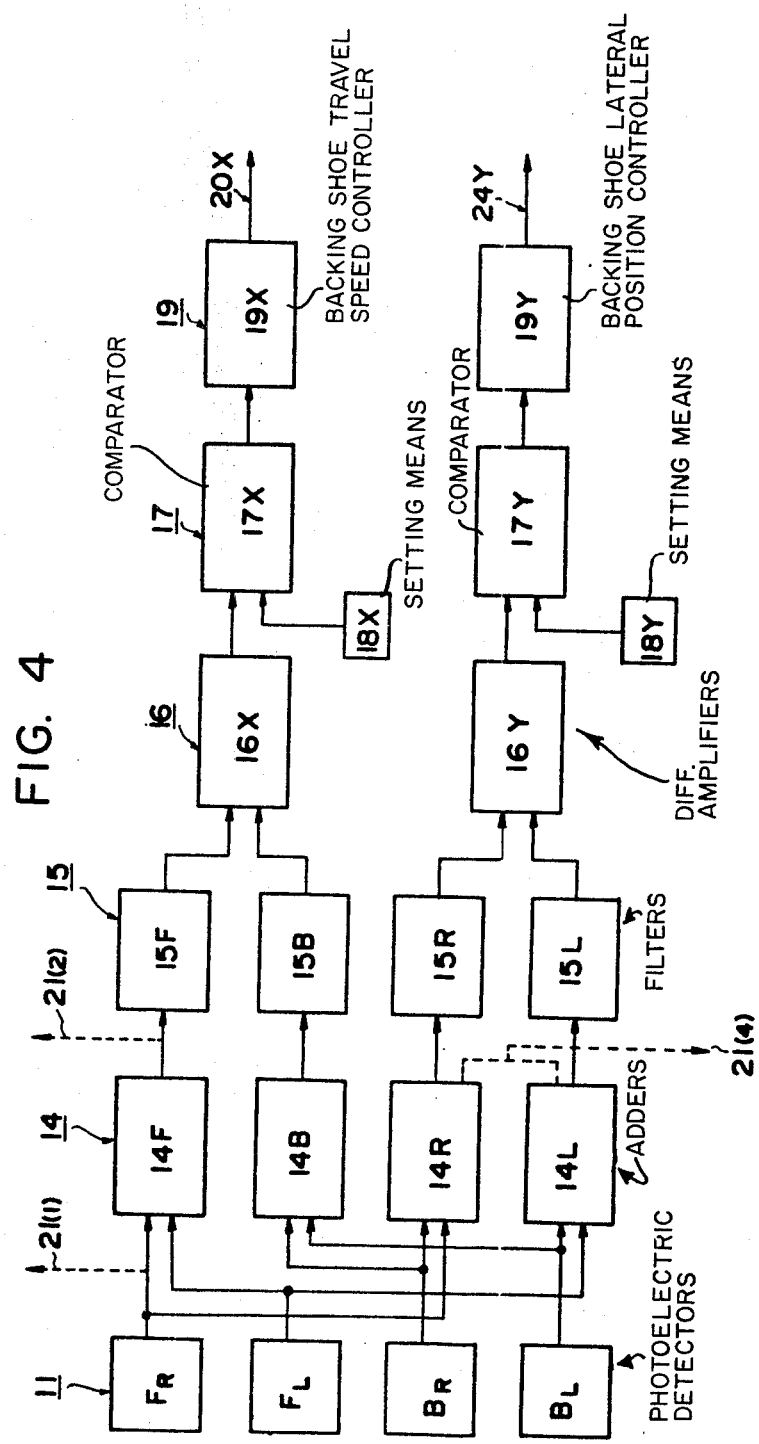

METHOD OF CONTROLLING SYNCHRONIZED MOVEMENT OF BACKING SHOE IN AUTOMATIC ONE-SIDE WELDING

BACKGROUND OF THE INVENTION

The present invention relates to a control method whereby in automatic one-side welding the backing shoe is moved in synchronism with the welding electrode while adjusting the lateral position of the backing shoe with respect to the direction of welding.

An automatic one-side welding of the type in which the welding is perfomed while moving a welding electrode and a backing shoe along the welding seam of steel plates has been used widely in the welding of heavy steel plates such as shell plating assemblies of ships owing to its high efficiency. In order to weld together the plates having curved surfaces, it is essential that the travel speed of the welding electrode and the backing shoe respectively moving over the front and back surfaces of the steel plates along the curved surfaces thereof are synchronized with each other so as to always maintain them in proper alignment with each other. Thus a method is known in the art in which their travel speeds are preliminarily adjusted in accordance with the difference in curvature radius of movement between them. A disadvantage of this method is that since the calculation and setting of the travel speeds are extremely difficult in the case of welding hull blocks including curved portions with many different curvatures and since the calculation is made mainly on the basis of the design values, the deviation due to the error between the design values and the actual dimensions of the actual welding portions and the structural error of the transporting mechanism will be increased with an increase in the movement and the welding electrode and the backing shoe will be greatly shifted from their properly aligned positions, thus sometimes causing failure of the backing shoe to perform its function in extreme cases.

With the above type of automatic one-side welding method, measures are taken so that a transport supporting structure such as a rail is provided on each side of the steel plates to extend parallel thereto so as to move the welding apparatus and the backing shoe, whereby the backing shoe is displaced to follow the lateral displacement of the welding electrode with respect to the direction of welding and thus the backing shoe is positioned at the lateral center of the welding electrode with respect to the direction of welding. However, in the welding of such steel plates including a large number of curved portions with a variety of curvatures, to maintain the transport supporting structures provided on the sides of the steel plates in exactly parallel relation itself is not an easy matter and an error tends to occur in the synchronized displacements, thus causing the center of the backing material such as a backing glass fiber stacked tape to deviate from the position directly below the welding electrode and causing the burned area of the backing tape to extend to the tape edges and thereby tending to fail to produce the desired weld bead.

The method of moving a backing shoe in synchronism with a welding apparatus has been proposed, as for example, in Japanese Patent Publication No. 52-43612 in which ultrasonic sensors each detects arc sound at each of the front and rear ends of a backing shoe to control so that the arc position is always held within a predetermined area of the backing shoe. This method is disadvantageous in that the detection of the position of the arc point by means of sound waves causes external noise, mechanical vibrations, etc., to be superposed on the arc sound. Futher, the spacing between the sensors detecting arc sound cannot be selected wide enough due to the limited dimension of the backing shoe and therefore it is difficult to detect the difference in sound pressure level with a high degree of sensitivity. As a result, the accuracy of synchronizing the movement of the backing shoe with the movement of the arc position cannot be expected to be so high and there is not much possibility of using the detection signals for the purpose of controlling the welding parameters or the like, for example.

SUMMARY OF THE INVENTION

It is an object of the invention to provide a method of controlling the synchronized movement of a backing shoe in the automatic one-side welding whereby the backing shoe is correctly and highly accurately aligned with the position beneath the welding point of the electrode with respect to the direction of welding as well as in the lateral direction of the backing shoe.

It is another object of the invention to provide such method of controlling the synchronized movement of a backing shoe which is capable of additionally controlling such welding parameters as welding current, arc voltage, welding sped, etc. and thereby controlling the shape of reverse side bead and the piercing force of arc.

The method of the invention for controlling the synchronized movement of a backing shoe features the following steps 1 to 5.

1. A photoelectric detector is embedded in the surface of a backing shoe contacting a backing material at each of four positions, i.e., right-front, right-back, left-front and left-back positions immediately below a welding electrode with respect to the direction of welding and the detectors are arranged at predetermined distances from each other so as to each received the light emitted from the back surface of the welding joint and transmitted through the light-transmittable backing material and thereby to generate an electric signal corresponding to the received light magnitude.

2. The front signals, the back signals, the right signals and the left signals are respectively added.

3. Two signals respectively corresponding to the difference between the front and back sum signals and the difference between the right and left sum signals are generated.

4. The difference electric signals are respectively compared with predetermined proper synchronized travel signal and proper position signal.

5. The travel speed and lateral position of the backing shoe are controlled in accordance with the comparison results so as to maintain the below-electrode-point at a predetermined position among the light detecting positions on the backing shoe.

BRIEF DESCRIPTION OF THE DRAWINGS

FIG. 4 is a block diagram showing the control system used with the embodiment of the method according to the invention.

DESCRIPTION OF THE PREFERRED EMBODIMENT

Figure 1:
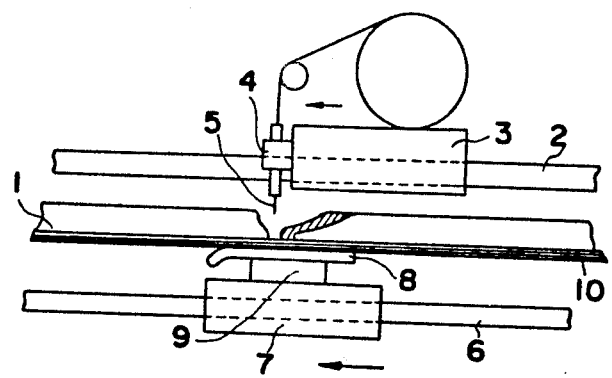
FIG. 1 is a partially cutaway side view schematically showing an embodiment of an automatic one-side welding apparatus for performing the method of the invention.

The method of the invention will now be described in greater detail with reference to the drawings. FIG. 1 is a partially cutaway side view showing schematically one form of the conventionally used automatic one-side welding.

In FIG. 1, numeral 1 designates a base metal to be welded. A transport support such as a rail is provided above the welding surfaces of the base metals and a welding apparatus 3 is moved over the rail 2 in the direction of an arrow. Numeral 4 designates a welding torch, and 5 a welding wire at the torch forward end. Provided on the opposite side of the base metals 1 are a transport support 6 comprising a rail or the like which is extended parallel to the welding apparatus transporting support 2 for moving a backing carriage 7. The backing carriage 7 is moved by a drive unit which is not shown over the rail 6 in the direction of an arrow in synchronism with the welding apparatus. Numeral 8 designates a backing shoe, and 9 a pressing unit for the backing shoe. Numeral 10 designates a backing material placed between the base metals 1 and the backing shoe 8 and in the method of this invention the backing material 10 consists of a light-transmittable material such as a glass fiber stacked tape. In the following description of the embodiment the light transmittable backing material will be described as consisting of a light transmittable backing tape.

Figure 2:
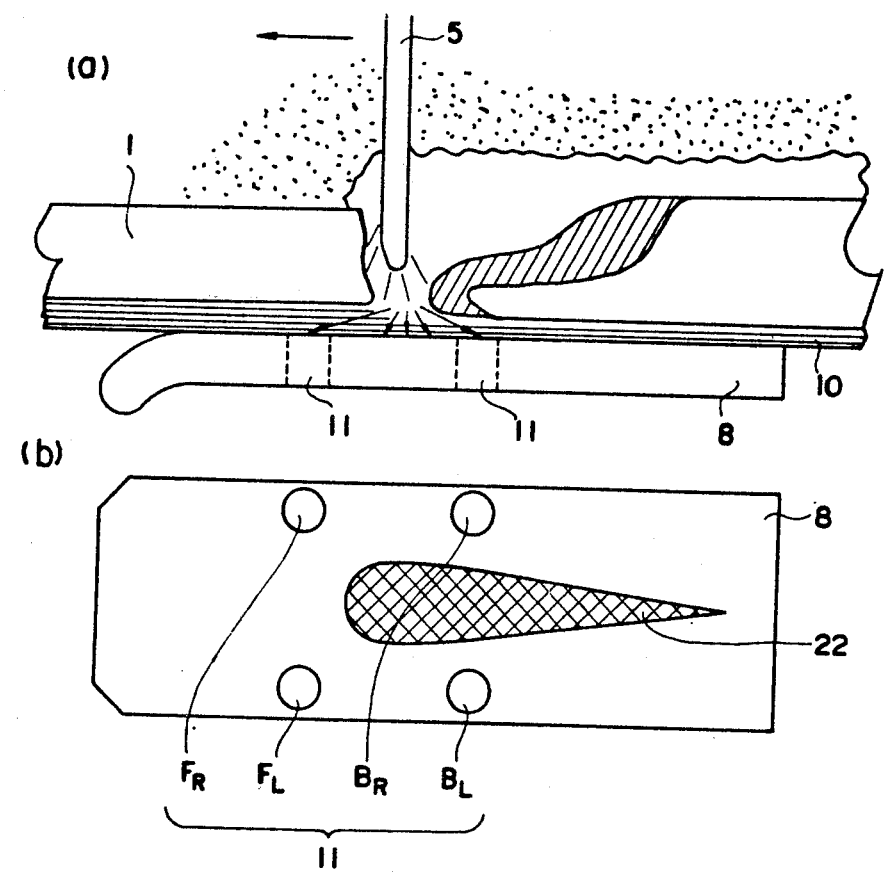
FIG. 2 shows in (a) a sectional side view showing an example of the automatic one-side welding area for performing the method of the invention and in (b) a plan view of the backing shoe.

In order to perform the method of this invention, four photoelectric detectors such as photodiodes, phototransistors, cadmium sulfide photoconductive cells or solar cells 11 are embedded in the surface of the backing shoe 8 which is in contact with the backing tape 10. The photoelectric detectors 11 are respectively embedded in right-front, right-back, left-front and left-back positions just below the electrode with respect to the direction of welding and the detectors are arranged at predetermined distances from each other as shown in FIG. 2. The right front photoelectric detector is designated $F_R$, the left front detector $F_L$, the right back detector $B_R$ and the left back detector $B_L$. The facing surface of the backing tape 10 can be seen by the photoelectric detectors 11, and thus the light emitted from the back surface of the welding joint and transmitted through the backing tape 10 is received by each detector which in turn generates a signal corresponding to the received light magnitude.

In this case, if the photoelectric detectors 11 are fitted in the holes formed in the backing shoe 8 and the upper surfaces of the holes are sealed with glass or the like so as to make the upper surface of the backing shoe 8 into a level surface, it is possible to prevent the danger of the backing tape 10 being caught in the depressions of the holes or caused to wrinkle during the movement. In this case, even if the glass or the like filling the holes is lower in heat conductivity, this cannot be detrimental to the reverse side bead due to the fact that the hole positions are spaced from just below the electrode to the right and left, respectively.

Figure 3:
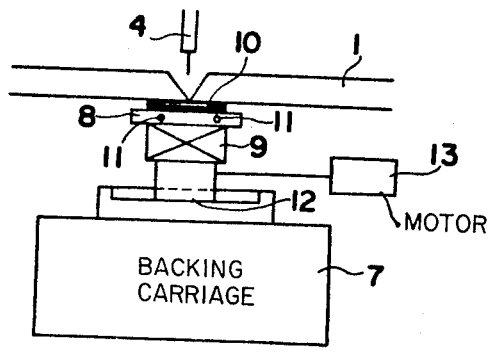
FIG. 3 is a sectional front view showing an embodiment of the backing unit for performing the method of the invention.

For the purpose of performing the method of this invention, means is further provided to adjust the position of the backing shoe 8 laterally with respect to the direction of welding as will be seen from FIG. 3 showing schematically an embodiment of the means. In the illustrated embodiment the means comprises laterally movable slide means 12 disposed between the body of the backing carriage 7 and the backing shoe pressing unit 9 and the slide means 12 is connected to a position adjusting motor 13, whereby the backing shoe 8 and the pressing unit 9 are slid by the operation of the motor 13 and the lateral position of the backing shoe 8 is adjusted.

Referring again to FIG. 2, FIG. 2(b) shows by way of an example the position of a red heated zone 22 of the reverse bead area which is shown on the surface of the backing shoe for purposes of illustration. With the portion below the welding electrode 5 as the center, the front part of the red heated zone 22 is formed into substantialy a semi-circular shape and its rear part is gradually decreased in width and formed into a caudal fin shape. While the photoelectric detectors 11 are arranged on all sides of the welding electrode 5, their portions should preferably be arranged at some spaces from each other so as to produce the desired front-back difference electric signal and right-left difference electric signal. On the other hand, the received light magnitude decreases greatly with an increase in the distance from the point just below the welding electrode 5 and thus the embedding positions of the photoelectric detectors 11 are determined by experiments or the like. While, in the illustrated embodiment, the photoelectric detectors 11 are positioned at the apexes of a regular square which are equally distanced from the point just below the welding electrode 5, the invention is not intended to be limited to this arrangement and the detectors may be arranged in any way. However, to arrange the detectors as in the case of the illustrated embodiment, particularly to arrange the right and left detectors symmetrical with the center line is convenient from the standpoint of calculating, designing and checking the method of the invention.

Next, the control method of the invention will be described with reference to the block diagram of FIG. 4 showing the construction of a control system. The light outputs of the photoelectric detectors $F_R$, $F_L$, $B_R$ and $B_L$ are added by adders 14, that is, the front outputs are added by an adder 14F, the back outputs by an adder 14B, the right outputs by an adder 14R and the left outputs by an adder 14L. The resulting sum signals are respectively passed through filters 15F, 15B, 15R and 15L to transmit only the desired components, so that the front and back sum signals are applied to a differential amplifier 16X and the right and left sum signals are applied to a differential amplifier 16Y to produce the respective difference outputs. The resulting difference outputs are respectively applied to comparators 17X and 17Y in which the difference outputs are respectively compared with the proper synchronized travel signal and the proper lateral position signal which have been applied preliminarily to the comparators from setting means 18X and 18Y. The comparison results or the resulting difference signals are respectively applied to a backing shoe travel speed controller 19X and a backing shoe lateral position controller 19Y so that in response to the resulting output signals 20X and 20Y, the speed of the motor for driving the backing carriage 7 is controlled and the position adjusting motor 13 for the backing carriage 7 is operated, thus adjusting the position of the backing shoe 8.

More specifically, the light of the arc at the below-electrode-point is transmitted through the light transmittable backing tape 10 and it is then projected on the photoelectric detectors $F_R$, $F_L$, $B_R$ and $B_L$. At the same time, the incident light from the red heated portion of the reverse side bead is received by the photoelectric detectors $B_R$ and $B_L$ which are located behind the below-electrode-point in the direction of welding. When the below-electrode-point is located between the front photoelectric detectors $F_R$ and $F_L$ and the back photoelectric detectors $B_R$ and $B_L$, the resulting added detector outputs are substantially equal to each other with respect to the arc radiation, and the sum output of the back photoelectric detectors includes an amount due to the incident light from the red heated portion of the reverse side bead. As a result, using this value as a reference signal value, the setting means 18X applies a proper synchronized travel signal to the comparator 17X where the signal is compared with the output of the differential amplifier 16X. For example, when the resulting comparator output is positive, the backing shoe 8 is advanced relative to the electrode, whereas when the reverse is the case the backing shoe 8 is lagging relative to the electrode, and the proper synchronized travel signal determines a synchronized position of the backing shoe 8 with respect to the below-electrode-point. When the comparator output is applied to the controller 19X, the controller 19X varies the speed of the drive motor of the backing carriage 7 so as to reduce the comparator output to zero. As a result, the backing shoe 8 is moved while always maintaining it at a predetermined corresponding position relative to the below-electrode-point. In this case, since the photoelectric detectors which are respectively arranged in front and in the back of the below-electrode-point respectively include a pair of right and left detectors and since the detector outputs are used in the form of the sum of the respective two outputs, even if the backing shoe is laterally leaned or inclined, the front and back detector outputs can be prevented from being unbalanced.

When the below-electrode-point is located between the right-side photoelectric detectors $F_R$ and $B_R$ and the left-hand photoelectric detectors $F_L$ and $B_L$, the amounts of light received due to the arc and the reverse bead red heated portion are equal and consequently the resulting sum detector outputs are equal to each other. As a result, where the photoelectric detectors $F_R$, $B_R$, $F_L$ and $B_L$ are arranged symmetric with the direction of welding line extending through the below-electrode-point, the setting means 18Y is preset to zero value, whereas when the detectors are not arranged symmetrically, the setting means 18Y is preset to a proper lateral position signal value which has been determined by experiments. The predetermined signal is applied from the setting means 18Y to the comparator 17Y and the signal is compared with the output of the differential amplifier 16Y, thus generating a signal for adjusting the lateral position of the backing shoe 8. When the comparator output is applied to the input of the controller 19Y, the controller 19Y operates the position adjusting motor 13 for the sliding means 12 of the backing carriage 7 so as to reduce the comparator output to zero.

In accordance with the above-described backing shoe synchronized travel control method according to the invention, the relative displacement of the backing shoe and the below-electrode-point can be accurately detected always without being subjected to any disturbance during the welding operation and thus the backing shoe can be moved synchronously while alway being held in proper alignment with the welding point. In the past, some control methods have been proposed in which the position of a backing shoe in the direction of welding is detected by means of ultrasonic waves or light and the backing shoe is moved synchronously, and these method are disadvantageous in that in the welding of steel plates including a number of curved surface portions with a large number of carvatures the backing shoe is inevitably displaced laterally and this results in an error in the ditection of the longitudinal position thus making it difficult to effect the synchronized travel control properly. On the contrary, in accordance with the method of this invention the speed of the backing shoe in the direction of travel is controlled while controlling the displacement of the lateral position of the backing shoe so that the lateral position of the backing shoe can always be maintained properly and simultaneously the speed of the backing shoe in the direction of travel can be controlled precisely, thus always maintaining the backing shoe in proper alignment with the below-electrode-point.

Further, since the outputs of the photoelectric detectors 11 are determined according to the welding conditions, as shown in FIG. 4, it is possible to take out to the outside the output 21(1) of one photoelectric detector, preferably the front photoelectric detector $F_R$ or $F_L$, the sum output 21(2) of the two photoelectric detectors, preferably the front photoelectric detectors $F_R$ and $F_L$ or the sum output 21(4) of the four photoelectric detectors $F_R$, $F_L$, $B_R$ and $B_L$, whereby in response to the output 21(1), 21(2) or 21(4) the welding parameters such as the welding current, arc voltage, welding speed, etc., are controlled to control the heat input and thereby to control the shape of reverse side bead and the piercing force of arc.

The method of the invention has great industrial advantages in that since the small photoelectric detectors embedded in the backing shoe constitute the detecting system, the effects of the external light can also be eliminated, that the desired signals for welding control can also be produced and so on.

DESCRIPTION OF THE PREFERRED EXAMPLE

The method of the invention was performed in connection with the automatic one-side welding for welding mild steel plates of 16 mm thick over the entire weld length of 15 mm by submerged arc welding. The mild steel plates were curved and the weld line was curved 2 m over the entire length of 15 m. The welding conditions were as follows:

Welding current: 850 A, arc voltage: 36 V
welding wire: mild steel wire (Trademark KW-43) of 4.8 mm$\phi$;
flux: bonded type (Tradmark KB-50); and welding speed: 310 mm/min. The backing tape consisted of one made by laminating 13 glass fiber sheets each 0.25 mm thick (total thickness of 3.25 mm) and the photoelectric detectors consisted of cadmium sulfide photoconductive cells which were embedded in the backing shoe with a longitudinal spacing of 40 mm and a lateral spacing of 40 mm. The travel speed and the lateral position of the backing shoe were controlled in such a manner that the below-electrode-point was held at the center of the photoelectric detectors arranged in the form of a regular square.

The control accuracy of the backing shoe was such that the deviation of the lateral position was less than 1 mm and the backing shoe was moved in excellent synchronism with the electrode, thus reducing the deviation of the backing shoe in the direction of travel to less than 2 mm.

Welding current was controlled in such a manner that the sum output of four photoelectric detectors was kept at a predetermined level. As a result the even back bead width was obtained.

We claim:

1. In an automatic one-side welding process of the type wherein a light-transmittable backing material is placed in contact with a back surface of a welding joint of base metals, and a backing shoe movable in synchronism with movement of a welding apparatus is held in contact with the back surface of said welding joint just below an electrode through said backing material to thereby effect the welding of said base metals, a method of controlling the synchronized movement of said backing shoe in one-side welding, said method comprising the steps of:

producing an electric signal by each of four photoelectric detecting means adapted to receive light from the back surface of said welding joint through said backing material to produce electric signals corresponding to the amount of light received thereby, said photoelectric detecting means being embedded in the surface of said backing shoe placed in contact with said backing material at four positions of right-front, right-back, left-front and left-back relative to just below said electrode with respect to a direction of welding, said positions being arranged with predetermined longitudinal and lateral spaces therebetween;

adding said signals corresponding to said front positions, said back positions, said right positions and said left positions, respectively, to obtain front and back sum signals and right and left sum signals;

producing difference signals corresponding to the difference between said front and back sum signals and the difference between said right and left sum signals, respectively;

comparing said difference signals with a predetermined proper synchronized travel signal and a predetermined proper position signal, respectively, to obtain corresponding comparison results; and controlling the speed of travel and the lateral position of said backing shoe in accordance with said comparison results so as to maintain said below-electrode-point at a predetermined position with respect to said light receiving positions on said backing shoe.

* * * * *